A. R. SELDEN.
AUTOMATIC FUEL FEEDING DEVICE.
APPLICATION FILED DEC. 18, 1908.

985,211.

Patented Feb. 28, 1911.

4 SHEETS—SHEET 1.

WITNESSES:
Clarence W. Carroll
L. Thon

INVENTOR:
Arthur R. Selden
by Osgood & Davis
his attorneys

A. R. SELDEN.
AUTOMATIC FUEL FEEDING DEVICE.
APPLICATION FILED DEC. 18, 1908.
985,211.
Patented Feb. 28, 1911.
4 SHEETS—SHEET 2.
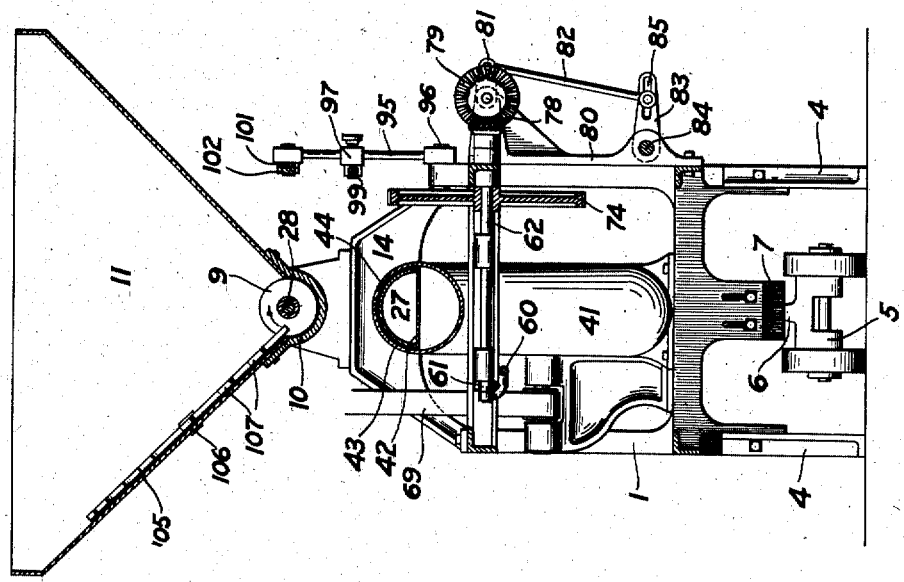
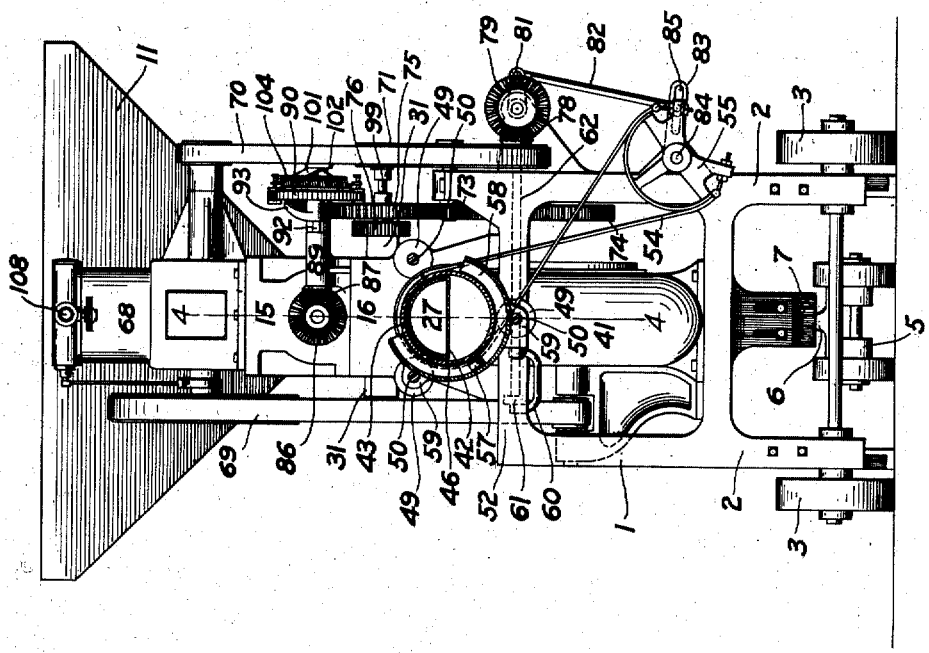
WITNESSES:
Clarence W. Carroll
L. Thow
INVENTOR:
Arthur R. Selden
by Osgood & Davis
his attorneys

A. R. SELDEN.
AUTOMATIC FUEL FEEDING DEVICE.
APPLICATION FILED DEC. 18, 1908.

985,211.

Patented Feb. 28, 1911.

4 SHEETS—SHEET 3.

WITNESSES:
Clarence W. Carroll
L. Thow

INVENTOR:
Arthur R. Selden
by Osgood & Davis
his attorneys

A. R. SELDEN.
AUTOMATIC FUEL FEEDING DEVICE.
APPLICATION FILED DEC. 18, 1908.
985,211.
Patented Feb. 28, 1911.
4 SHEETS—SHEET 4.
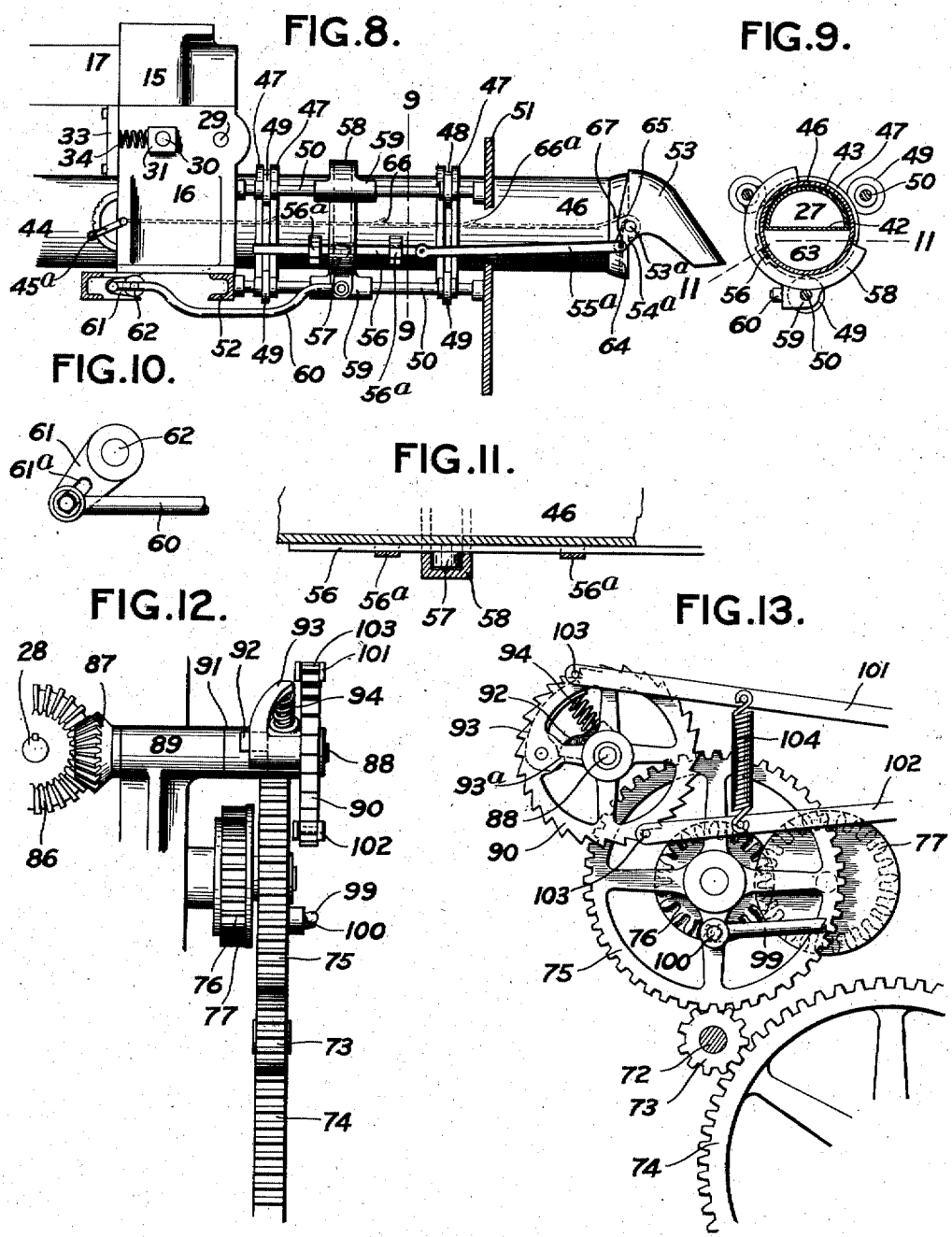
WITNESSES:
Clarence W. Carroll
L. Thow
INVENTOR:
Arthur R. Selden
by Osgood & Davis
his attorneys

UNITED STATES PATENT OFFICE.

ARTHUR R. SELDEN, OF ROCHESTER, NEW YORK, ASSIGNOR OF ONE-THIRD TO WILLIAM H. CALDWELL AND ONE-THIRD TO C. SCHUYLER DAVIS, BOTH OF ROCHESTER, NEW YORK.

AUTOMATIC FUEL-FEEDING DEVICE.

985,211. Specification of Letters Patent. Patented Feb. 28, 1911.

Application filed December 18, 1908. Serial No. 468,220.

*To all whom it may concern:*

Be it known that I, ARTHUR R. SELDEN, a citizen of the United States, and resident of Rochester, in the county of Monroe and State of New York, have invented certain new and useful Improvements in Automatic Fuel-Feeding Devices, of which the following is a specification.

This invention relates to automatic fuel feeding devices, and its principal object is to produce a machine that is adapted to handle commercial grades of coal, and that will utilize to the best advantage in the processes of combustion the air or steam by which and with which the fuel is fed to the furnace.

Other advantages will be disclosed in the course of the specification.

Figure 1:
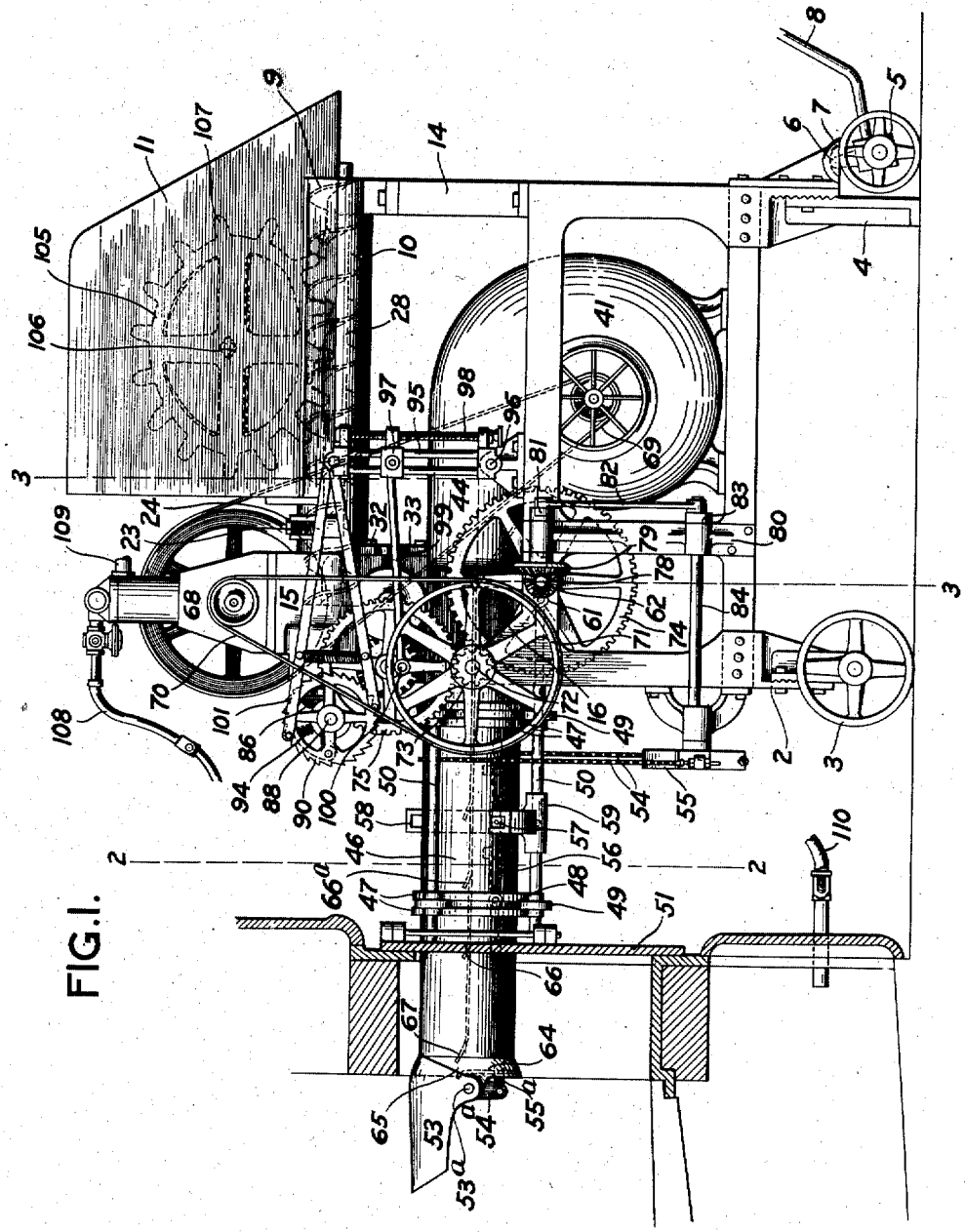
Figure 5:
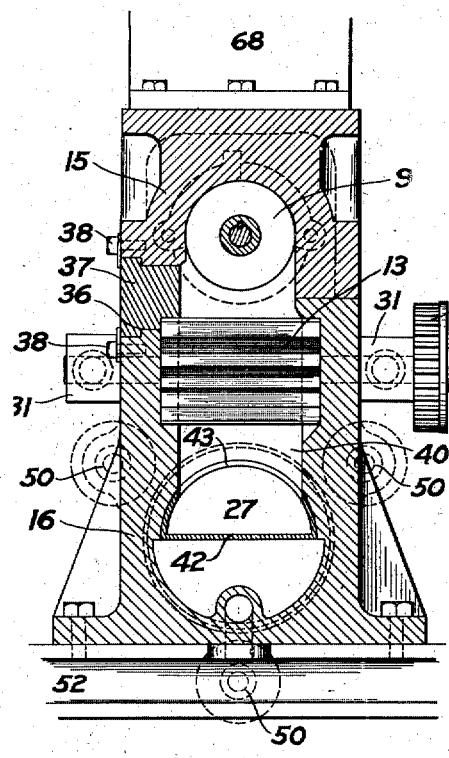
Figure 4:
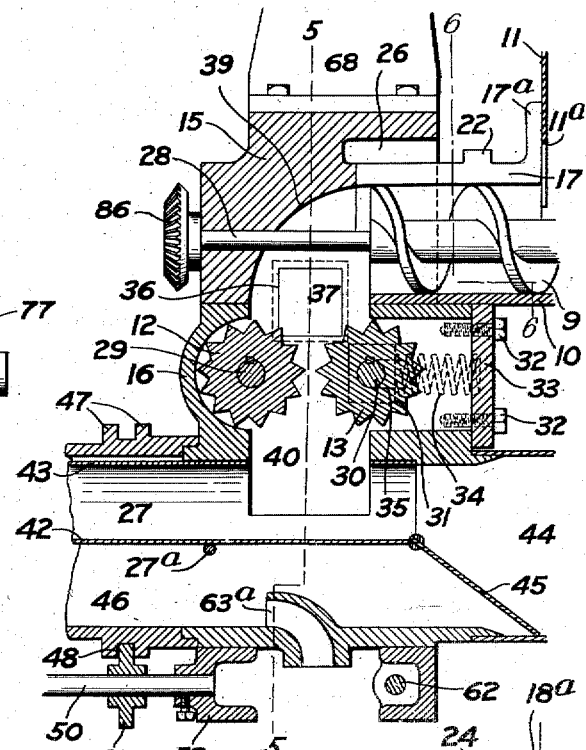
Figure 6:
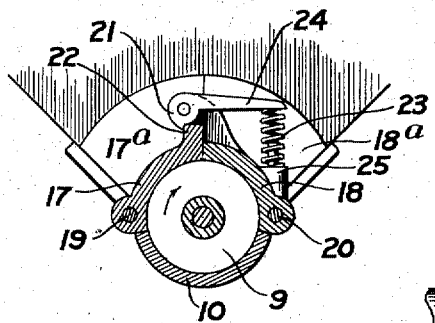
Figure 7:
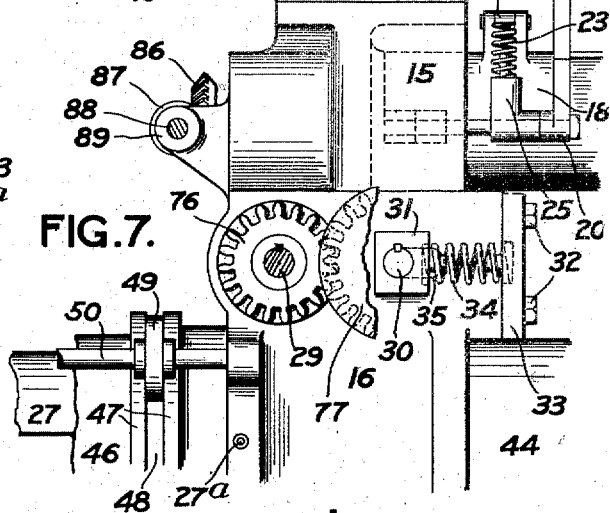

In the drawings:—Figure 1 is a side elevation of a machine embodying the present invention; Figs. 2 and 3 are, respectively, sections on the line 2—2 and 3—3 of Fig. 1; Fig. 4 is a section on the line 4—4 of Fig. 2; Fig. 5 is a cross-section on the line 5—5 of Fig. 4; Fig. 6 is a cross-section on the line 6—6 of Fig. 4; Fig. 7 is an exterior elevation of the parts shown in Fig. 4; Fig. 8 is an elevation of the feed pipe from the side opposite to that shown in Fig. 1; Fig. 9 is a cross-section on the line 9—9 of Fig. 8; Fig. 10 is an enlarged elevation of a detail; Fig. 11 is an enlarged cross-section on the line 11—11 of Fig. 9; Fig. 12 is an enlarged front elevation of a portion of the actuating mechanism; and Fig. 13 is a side elevation thereof.

The improvements in question are shown in connection with a stoker that is mounted upon a carriage 1 in order that it may be wheeled into place before the furnace door, when it is to be used, and as readily removed when occasion may require. To this end the forward legs 2, 2 of the carriage are set on wheels 3, 3, respectively, and the legs 4, 4 at the rear, which normally rest upon the floor, can be elevated till they are free from the floor by a two-wheeled truck 5. This truck carries a projection 6 that slips into a socket 7 centrally located on the frame (see Figs. 1, 2 and 3), and takes the load at the rear of the carriage when said projection 6 is raised into a vertical position by the handle-bars 8 of the truck.

The stoker comprises the following elements, all of which may be supported upon the carriage, and are so shown, viz: a hopper for the fuel supply; a feed-pipe from which the fuel is discharged into the furnace; a conveyer by which the fuel is carried from the hopper to the feed-pipe at a uniform rate; crushing means located between the fuel conveyer and the feed-pipe; a blower or other source of fluid pressure for discharging the fuel from the feed-pipe into the furnace; a moving plate to spread the stream of air and fuel over the grates as it issues from the spout, or mouth of the feed-pipe, and an engine or motor operatively connected to those of said parts that are movable.

The screw-conveyer 9 (which is selected as being best adapted for a continuous, even feed, and which is most desirable), and the casing 10 that contains it, lie at the base of the hopper 11, and, extending forward beyond it, deliver the coal to the crushing rollers 12 and 13. The screw-conveyer and its casing are supported at the rear by a supplemental frame 14, and forwardly by casings 15 and 16. The hopper is preferably long, from the back toward the front of the machine, and again preferably is open at the back for the reception of the coal. The casing 10 that contains the screw conveyer is open at the top from end to end, but between the hopper and the casting 15 (see Fig. 4) the upper half of the casing 10 is made in the form of two lid-like pieces 17 and 18 (see Fig. 6) that are hinged at 19 and 20, respectively, to the lower half of the casing and are locked together yieldingly by a latch 21 on one of them (18) that engages a shoulder 22 on the other (17) and is held normally against it by a compressible spring 23 placed between an arm 24 carried by the latch and a seat 25 on the casing 10. The lower edge 11$^a$ of the front side of the hopper (see Fig. 4) is some distance above the lids 17 and 18, and the intervening space is closed by flanges 17$^a$ and 18$^a$ on said lids, respectively, which overlap the lower edge of the hopper, as shown in Fig. 4, so that the coal is kept from escaping, in any considerable quantity, when the lids are sprung apart.

A piece of coal or other substance, too large to enter the casing 10 of the screw-conveyer, will in most cases be crushed by the screw-conveyer against the edge of said casing 10, these parts being designed for that purpose, and being sufficiently heavy to do the work. But if a piece gets part way into the screw-conveyer, and is not crushed by the latter against the side of the casing, it will be carried forward by the screw-conveyer along the edge of its casing, and beneath the coal supply in the hopper, till it reaches the lower rear edges of the lids 17 and 18, where the screw-conveyer brings greater crushing pressure to bear upon the undesirable piece than it can where the edge of the casing receives the thrust. Accordingly, the screw-conveyer and the edges of these lids 17 and 18 are sufficiently substantial to crush any piece of coal that can become caught between them; while pieces of foreign substance that arrive there, too large to pass through the casing and too hard to be crushed at this point in the manner aforesaid, will release and open the lids 17 and 18, thereby relieving the strain upon the machine, and enabling the screw-conveyer either to discharge the unmanageable piece from the machine altogether, or to carry it forward and deliver it to the crushing rollers 12 and 13.

The spring 23 by which the latch is controlled is sufficiently strong to resist such pressure on the lids 17 and 18 as may be required to crush pieces of coal, but when anything harder is caught at this point it yields before the safety of the machine is threatened. The lids extend forward into the recess 26 (see Fig. 4), and are thus prevented from opening unnecessarily wide, for they engage the casing 15 after having opened sufficiently to permit the passage of anything that is reasonably likely to spring them. These means for safeguarding the machine are important features of it, and are among those for which protection is sought.

When coal is injected into the furnace, it can be distributed best when it is approximately uniform in size, for then it will all have about the same momentum when it enters the furnace. Furthermore, experiment has established that for general purposes and under ordinary conditions, other things being equal, the best fire can be obtained when the pieces are comparatively small—probably within an inch in their longest diameter where bituminous coal is concerned. This problem then is to reduce the coal to comparatively uniform size, without too great cost, and without employing means that will impair the regularity and uniformity of the feed, for stokers of this kind are designed for an even, uniform feed that will practically replace the coal as it burns on the grates and maintain a thin bed. But to crush the coal before using it is so expensive that it is prohibitive in the case of small plants; while to put a crusher within the hopper in place of the screw-conveyer, as has been done, is to sacrifice the uniformity and regularity that is so important, as stated, in the operation of feeding the coal to the furnace. And, finally, to place the crusher within the hopper above the screw-conveyer throws an unnecessarily heavy load upon it (since then it is obliged to work in and handle the whole mass of coal), and has other disadvantages that need not be discussed in detail. But when a crusher (as, for example, that comprising the spaced rollers 12 and 13) is placed beneath the delivery end of the screw-conveyer, as shown in the drawings (see Fig. 4), and is so adjusted that coal within the maximum size desired drops freely through it into the feed-pipe, then the crusher is required to handle only a small proportion of the coal that passes through it (for a large proportion of the finer commercial grades of bituminous coal that are sold on the market is finer than the maximum size that will usually be required for the furnace), and the pieces that are operated upon by the crusher will not disturb the uniform character of the feed.

The rollers are shown with their axes at right angles to the hub 28 of the screw-conveyer because in that position it is a simple matter to gear them to the driving engine (or motor), though it results in a more compact construction to place them parallel with, and on each side of, the casing of the screw-conveyer, and that also brings the hopper somewhat lower down.

The crushing rollers are adjustable with respect to each other for spacing, and furthermore one is adapted to give way, in order to save the machine, when anything too hard to crush is caught between them. To this end the shaft 29 of one of the rollers (12) is journaled in the casting 16, while the shaft 30 of the other roller (13) is journaled at each end in a block 31 (see Fig. 7) that is movable in the casing 16, transversely to the shaft of the roller. The rear end of the casting 16 is closed by a removable plate 33 secured by screws 32 (see Fig. 4). Springs 34, 34 between the blocks 31, 31 and the ends of the plate 33 (see Fig. 7) keep the roller 13 normally in the desired position, and slots 35, 35 in the casing 16 permit the roller to move transversely for adjustment, and also whenever anything is engaged by the rollers that is too hard to be crushed. Access is also given to the space above the rollers to remove foreign substances through a hand hole 36 (see Fig. 4), that is closed by a plate 37 held in place by screws 38, 38 (see Fig. 5). Since comparatively few of the pieces of coal that fall from the screw-conveyer will require crushing, very little power is required for the operation of the rollers.

It has been found in practice that the coal is apt to become caked in its passage through the screw-conveyer, particularly when wet and fine. The rollers disintegrate it, and if they fail to do so before the pocket above them fills, then the screw operates upon the mass to force it down upon the rollers, and so through them. Thus clogging is impossible. The inner surface 39 of the casing 15 is curved as shown in Fig. 4 to direct the coal to the rollers.

The location, between the feed-pipe from which fuel is discharged into the furnace, and the screw-conveyer whereby it is conveyed from the fuel supply to said feed-pipe at a uniform rate, of a crusher that is adapted to reduce the coal to the size desired without impeding the uniformity of the said feeding operation, is one of the important features of the invention for which protection is sought.

A blower 41 (see Fig. 1) is shown as the means for furnishing a fluid pressure to expel the coal from the spout or mouth of the feed-pipe 27. In the construction shown in Figs. 1 to 4, inclusive, the feed-pipe 27, upon which the coal falls from the rollers, has a flat surface 42, while its upper part 43 is curved to fit within an outer pipe 44 (see Fig. 1) that is attached directly to the blower. The feed-pipe 27 is supported wholly at its rear end where it lies on a cross-rod 27ª (see Figs. 4, 7 and 8) that is fastened in the casing 16. Said feed-pipe is open at its outer end, through which it receives air from the blower.

An adjustable damper 45 (see Fig. 4) operated by a suitable lever 45ª (see Fig. 8) regulates the proportions in which the air is delivered from the blower above and below the bottom 42 of the feed-pipe, respectively, when the second passage is made use of for purposes that presently will be described. In the drawings the second passage is represented as formed by a rotary sleeve 46 that joins the outer pipe 44, thus entirely inclosing the feed-pipe 27, which extends through said pipe 44 to, or near, its outer end, as indicated by dotted lines in Fig. 1. If the lower passage is omitted, the full volume of air from the blower passes into the feed-pipe 27, as is the case when the damper 45 is in the closed position shown in Fig. 4.

The rotary sleeve 46 has near each end, and integral with it, two annular ribs or collars 47, 47 (see Figs. 1 and 8), that form between them a runway that is adapted to receive rollers 49. These rollers are rotatably supported on rods 50, three of which are shown (see Fig. 2), all of which are fixed rigidly at one end in the fire-plate 51 and at the other end on brackets on the cross-frame 52 (see Fig. 5). The sleeve 46 is utilized to rock the fuel-spreading plate 53 back and forth, at angles with the vertical plane, and to that end the sleeve is rocked by a chain 54 that passes over it and is attached at each end to the segment 55. The operation of the segment will be explained as part of the description of the mechanism that drives the movable parts. The fuel-spreading plate 53 is also given an oscillatory movement at angles with the horizontal plane by an arm 54ª (see Figs. 1 and 8) that is operated by a link 55ª, and that in turn is connected with a horizontal rod 56. This rod is slidable in supports 56ª (see Fig. 11); and carries a roller 57 that lies within a collar 58 that incloses it on three sides. The collar is supported on two or more of the rods 50 by sleeves 59. One of these sleeves 59 is connected with a pitman 60 on a crank 61 that is attached to the transverse shaft 62 (see Fig. 8), while the crank 61 has a slot 61ª for adjustment of the pitman (see Fig. 10), in order to vary this oscillatory movement of the fuel-spreading plate 53. Accordingly as the crank 61 rotates, it reciprocates the collar 58, and, by reason of the connection between the collar 58 and the fuel-spreading plate 53 (through the roller 57, rod 56 and link 55ª), causes in turn said plate to rock on its pivot 53ª. At the same time that the fuel-spreading plate 53 is oscillated inwardly and outwardly in front of the spout, or mouth, of the feed-pipe 27, from which the fuel is discharged into the furnace, it (said plate 53) is being rocked transversely to and fro by the rocking of the sleeve 46, as before explained, so that the fuel is spread on both sides of the grates, as well as from front to rear. This latter movement causes the roller 57 to move idly in the grooved collar 58 without disturbing the operative relation of these parts.

The lower passage 63 beneath the bottom 42 of the feed-pipe proper 27 is designed for a fluid pressure that may consist of air, or steam, or both, and which is discharged through this lower passage 63 in order to accelerate the course of the fuel through the feed-pipe 27, and also, if desired, to direct the course of the current of fuel and air discharged from the spout or mouth of the feed-pipe. To this end air is admitted to the lower passage 63 from the blower 41 by the damper 45 (see Fig. 4), and steam, if used, enters through a forwardly-directed nozzle 63ª that can conveniently be introduced into the passage through the under part of the pipe 44. The air and steam are forced through the lower passage 63 under pressure, and are discharged through a vent or passage 65 left between a plate 64 that closes the end of the passage 63 and the end 67 of the floor 42 of the feed-pipe 27. The discharge of air or steam at this point both throws the fuel up against the spreading plate 53, and assists the air-current in the feed-pipe by sucking the fuel from the nozzle. Other vents or passages 66 may be provided that are represented as cut transversely across the bottom 42 of the feed-pipe 27 at different points throughout its length (see dotted lines in Fig. 1), and the air or steam discharged through these vents 66 serves to accelerate the fuel in its passage through the feed-pipe, preventing clogging and throwing the fuel into the upper part of the feed-pipe where the air-current is strongest. The vents 66 are represented as protected, respectively, by overhanging forwardly-directed lips 66ª, bent up from the bottom 42 of the feed-pipe, which also direct the air or steam forwardly toward the spout or mouth of the feed-pipe. The lower passage 63 is useful when it is desirable to mix steam with the fuel discharged into the furnace from the spout of the feed-pipe, and when fuel is being fed in such quantities that there is danger of its clogging the feed-pipe.

Other means besides the discharge of air or steam through the vent 65 are provided for directing toward the fuel-spreading plate 53 the current of fuel and air discharged from the spout or mouth of the feed-pipe 27, by slanting upwardly the feed-pipe 27, or, if preferred, the outer end of the bottom 42, as shown by dotted lines in Fig. 1. This stoker is to be distinguished from that class of stokers that are designed for feeding pulverized fuel, where the object is to form an inflammable mixture of the air and fine particles of coal, and so to discharge it into the furnace that it will burn at the spout or nozzle of the feed-pipe. If a downwardly-directed, oscillating spout or nozzle is used upon stokers adapted for pulverized fuel, and pulverized fuel is used, the flame produced by the fuel burning in suspension at the mouth of the spout, together with the surplus air discharged from it, has a blow pipe effect upon whatever coal may have escaped ignition and fallen upon the grates, which produces clinkers that it fuses into the grates. At the same time such a flame burns holes in the fire-bed, and injures other parts of the furnace besides the grates. On the other hand, if an oscillating spout or nozzle is used with coarser fuel that for the most part must be burned upon the grates, it focuses the air discharged from the spout so that it tends to extinguish the fire wherever it strikes, while none of the other parts of the combustion chamber receive sufficient air from this source. The stoker here described on the other hand is intended for coal of commercial grades, and is adapted for bituminous slack, semi-bituminous, and fine anthracite, so that the main considerations here are, first, to lay the coal evenly upon the grates without introducing an excess of air, by a continuous stream that replenishes the coal as fast as it is burned up, in order that a bed of uniform depth shall be maintained, and secondly, to spread the air discharged from the spout of the feed-pipe as much as possible over the grate surface. Again, stationary deflectors, or those having a vertical oscillatory movement only, depend for the even distribution of the coal upon its rebounding from the deflector, and upon the law of general average, since the fuel is not placed upon the grates by the deflector, or definitely guided thereby. The spreader of the present invention operates in a different manner. The larger pieces may rebound from it when it is interposed directly in the path of the fuel as it issues from the spout of the feed-pipe, but as the spreader turns this way and that it positively and accurately discharges the coal over different parts of the grate, covering all parts uniformly. By slanting up the end 67 of the bottom 42 of the feed-pipe 27, as shown in dotted lines in Fig. 1, or by employing a draft up through the vent 65 at this point, the tendency of the coal to rebound from the spreader 53 is minimized, for then it is thrown up against the under side of the spreader as it issues from the spout of the feed-pipe 27, and follows the contour of the spreader, to be discharged in a stream from its forward edge. This is also of importance as it controls whatever dust may be in the fuel. Ordinarily, the dust is blown over the bridge-wall when the spreader is in its elevated positions, but if blown up against the under side of the spreader, it is definitely directed down into the flames and is consumed at once. Finally, the air as it issues from the spout of the feed-pipe 27, expands as soon as it enters the furnace, and its forward impulse, which tends to cause it to stream directly across the furnace and over the bridge-wall, is here utilized by the spreader 53 to send it in all directions over the fire.

The moving parts of the machine are actuated by a prime mover 68 (in the drawings a steam engine) mounted on the top of the casting 15. A belt 69 on one side of it drives the blower 41, and a belt 70 on the opposite side drives all the other movable parts. The belt 70 leads over a pulley 71 on the countershaft 72. A pinion 73 on this shaft (see Figs. 1 and 13) meshes with a large gear 74, carried on the shaft 62, and also with a gear 75 carried on the shaft 29 of the crusher roller 12. This shaft 29 is connected with the shaft 30 of the roller 13 by gears 76 and 77, so that the rollers turn in opposite directions. These gears have long teeth, in order that they may not be thrown out of mesh when the roll 13 is moved laterally under the circumference described above.

The mechanism for rocking the spreading plate 53 is as follows: The shaft 62 carries a bevel gear 78 on the end opposite the crank 61, which meshes with another gear 79 that is journaled in a part 80 of the frame. On the end of the short shaft that carries the last mentioned gear a crank 81 is fixed (see Fig. 3), and a pitman 82, pivoted in its end, connects it with an arm 83, that is fixed upon the rock-shaft 84, and that, in turn, carries the segment 55. As the gear 74 rotates continuously, the crank 81 is also rotated, through the bevel gears 78 and 79, and the pitman 82 is caused to move up and down, thereby rocking the shaft 84 and swinging the rotary sleeve 46 as before described. The arm 83 has a slot 85 that affords means for adjusting the position of the lower end of the pitman 82 with respect to the shaft 84, thereby regulating the length of the movement of the sleeve 46.

The mechanism for operating the screw-conveyer 9 is shown in Figs. 1, 2, 3, 12 and 13, and is as follows: The conveyer shaft 28 has fixed to it a bevel gear 86, that meshes with a similar gear 87. The latter is fixed upon one end of a shaft 88 that is supported in a bearing 89, while a ratchet wheel 90 is loose upon the other end of said shaft. Between the wheel 90 and the bearing 89 is a collar 91 that also is fixed to the shaft 88, and on said collar is a projecting lug 92. A lever 93 is pivoted on the wheel 90, and engages at its short end 93ª with the lug 92 (Fig. 13). The long arm of said lever rests on a spring 94 that is carried on the hub of the wheel 90. As the latter is rotated in the direction indicated, the lug 92 is caught by the end 93ª of the lever 93, and the collar 91, the shaft 88, and the gear 87 are rotated thereby, thus turning the conveyer-screw 9. The resistance of the spring 94 to the force exerted in this motion is sufficient to prevent it from being compressed. If, however, a piece of unbreakable material is caught in either the screw 9 or the crusher rolls 12 and 13, the resistance becomes so great that the lug 92 causes the long end of the lever to swing downward, compressing the spring 94, and releasing the end 93ª of the lever from said lug. The wheel 90 continues to rotate, but the screw 9 stops until freed from the obstruction and until the lever 93 again catches the lug 92.

The wheel 90 is rotated by suitable means, so as to be easily regulated to different speeds. A convenient driving and regulating mechanism is shown in Fig. 1. A rocker arm 95 is pivoted on the carriage 1 at 96, and carries a cross-head 97 that is movable to any point upon the arm by means of a screw-threaded spindle 98. Said cross-head is connected with a pitman 99 that is pivoted on the gear 75 at 100. Pivoted to the upper end of the rocker-arm 95 is a pair of rods 101, 102, provided at their free ends with pins 103 engaging the ratchet wheel 90. The said pins are maintained in engagement with the teeth of said wheel by a spring 104 that pulls the rods 101, 102 toward each other. As the pitman 99 is moved back and forth by the rotation of the gear 75, the arm 95 is rocked back and forth, and the rods 101 and 102 are moved correspondingly. As said rods engage opposite sides of the wheel 90, it follows that the rod 101 operates said wheel only on the backward stroke, and the rod 102 only on the forward stroke. And since practically no time is lost between the forward and backward strokes, the screw 9 is rotated with practically a continuous movement. The adjustment of speed is easily effected by raising or lowering the cross-head 97 on the arm 95 by means of the spindle 98. Raising said cross-head reduces the speed by shortening the movement of the rods 101, 102, and lowering it increases the speed by lengthening the movement of said arm.

In order to prevent the fuel in the hopper 11 from becoming bridged over the feed-screw 9, as sometimes happens when the coal is both wet and fine, an agitator or stirring device may be employed. In the drawings (Figs. 1 and 3) a device for this purpose is shown that consists of a thin wheel 105, that is pivoted in the side of the hopper and lies flat against it. Said wheel has large teeth 107 around its periphery, that are of the proper pitch to be engaged by the convolutions of the screw 9. As the latter rotates, it turns the wheel 105 and loosens the fuel along the side of the hopper, thus breaking any arch that the coal may have formed over the screw-conveyer.

When a steam engine is used, as represented by 68 in the drawings, a flexible coupling 108 gives it steam from the boiler, and the exhaust steam is led from its exhaust port 109, either to the nozzle 63ª, shown in Fig. 4 as projecting into the passage 63 for the purposes described above, or to the discharge pipe 110, beneath the grates, where this steam is utilized both to accelerate the draft through the grates, and to cool them.

What I claim is:—

1. In a mechanical stoker, the combination of a fuel-hopper, a crusher adapted for the free passage of particles of fuel of less than a predetermined diameter, a fuel-tight casing connecting the hopper and the crusher, a screw-conveyer inclosed within and closely fitting said casing and adapted to transfer fuel under pressure from the hopper to and through the crusher, means for rotating the screw-conveyer at a constant speed to produce a constant and substantially uniform feed of fuel, and means for transferring the fuel constantly, as it is delivered from the crusher, into a furnace.

2. In a mechanical stoker, the combination of a fuel-hopper, a crusher comprising rollers spaced apart to permit the free passage of particles of fuel of less than a predetermined diameter, a fuel-tight casing connecting the hopper and the crusher, a screw-conveyer inclosed within and closely fitting said casing and adapted to transfer fuel under pressure from the hopper to and through the crusher, means for rotating the screw-conveyer at a constant speed to produce a constant and substantially uniform feed of fuel, and means for transferring the fuel constantly, as it is delivered from the crusher, into a furnace.

3. In a mechanical stoker, the combination of a fuel-hopper, a crusher adapted for the free passage of particles of fuel of less than a predetermined diameter, a fuel-tight casing connecting the crusher and the hopper, a screw-conveyer mounted within and closely fitting the casing and adapted to feed fuel to the crusher under pressure, means for rotating the screw-conveyer at a constant speed to produce a constant and substantially uniform feed of fuel through the crusher, a feed-pipe into which the fuel is discharged from the crusher, the feed-pipe being adapted to discharge the fuel into a furnace, and means for supplying a constant blast of fluid to and through the feed-pipe to convey the fuel constantly into the furnace as it is fed through the crusher.

4. In a mechanical stoker, the combination of a fuel-hopper, a crusher adapted for the free passage of particles of fuel of less than a predetermined diameter, a fuel and fluid-tight casing connecting the crusher and the hopper, a screw-conveyer mounted within and closely fitting the casing and adapted to feed fuel to the crusher under pressure, means for rotating the screw-conveyer at a constant speed to produce a constant and substantially uniform feed of fuel through the crusher, a feed-pipe into which the fuel is discharged from the crusher, the feed-pipe being adapted to discharge the fuel into a furnace, and means for supplying a constant blast of fluid to and through the feed-pipe to convey the fuel constantly into the furnace as it is fed through the crusher.

5. In a mechanical stoker, the combination with a hopper for a fuel supply, of a screw located in its throat; and a fuel-agitating wheel having peripheral teeth, pivoted to the side of the hopper, and adapted to be operatively engaged by the screw-conveyer; substantially as shown and described.

6. In a mechanical stoker, the combination with a fuel supply, of a spout adapted to discharge the fuel into a furnace; means for conveying fuel from said supply to said spout; means for discharging the fuel from the spout, including means for discharging fluid under pressure in an upward direction across the mouth of said spout; and a deflector arranged above the mouth of the spout in position to receive the fuel and direct it downwardly; substantially as shown and described.

7. In a mechanical stoker, the combination of a feed-pipe adapted to discharge fuel into a furnace; means for conveying fuel to the feed-pipe; a passage for fluid under pressure communicating with the feed-pipe at one or more points between the point where fuel enters the feed-pipe and the mouth of said pipe; means for supplying a fluid under pressure to both said feed-pipe and said passage, whereby the fuel is discharged into the furnace; means for regulating the proportions in which the fluid is delivered to said passage and feed-pipe, respectively; and a deflector located beyond the mouth of the feed-pipe in position to receive the fuel discharged therethrough; substantially as shown and described.

8. In a mechanical stoker, the combination of a fuel crusher having a passage therethrough of fixed normal diameter, and adapted to crush pieces of fuel of greater diameter than said passage, means for forcing a constant and uniform stream of fuel under pressure through the crusher and means for discharging the fuel constantly into a furnace as it issues from the crusher.

ARTHUR R. SELDEN.

Witnesses:
D. GURNEE,
L. THON.